March 22, 1960
P. J. PACKMAN
2,929,130
MASS PRODUCTION PROCESSES
Filed July 24, 1953
23 Sheets-Sheet 1
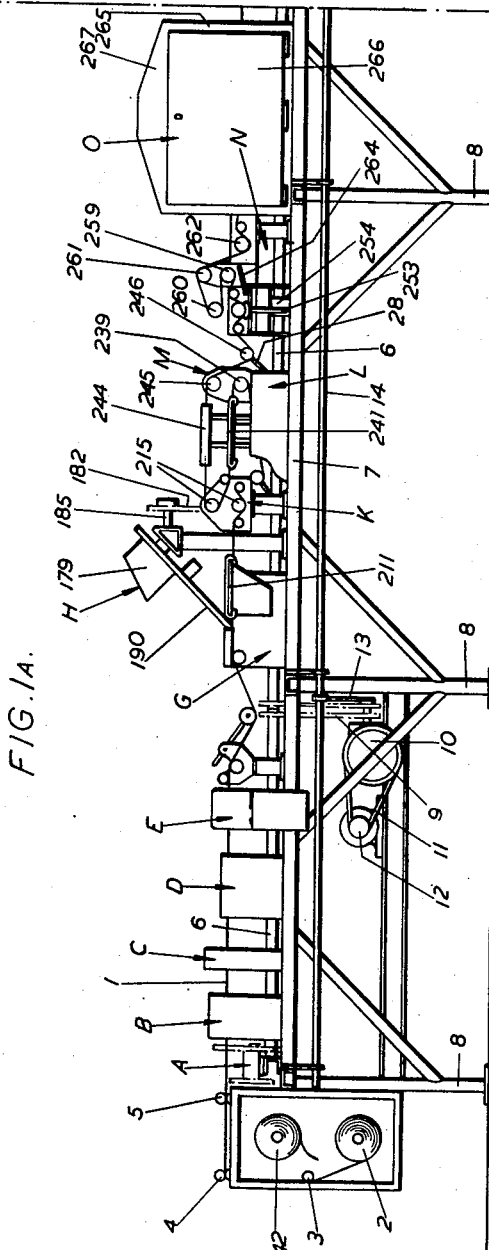
FIG.IA.
Inventor
Percival James Packman
By
Bailey, Stephens and Huettig
Attorneys

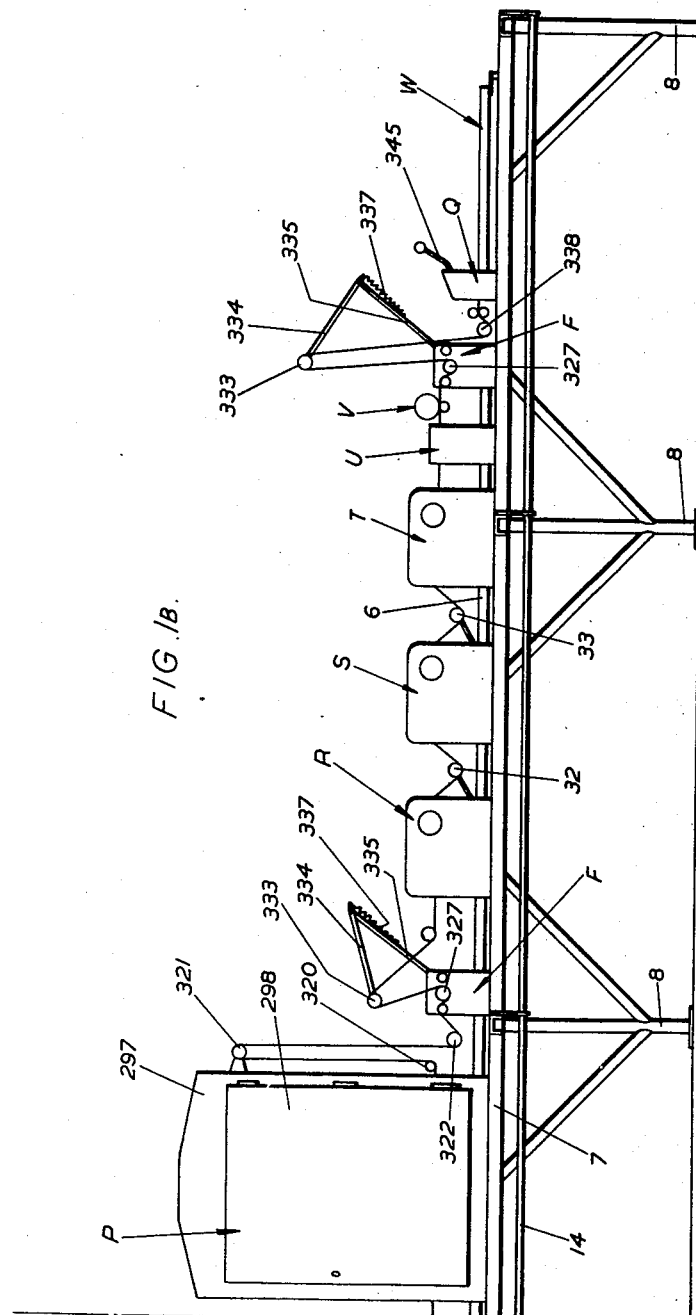

March 22, 1960  P. J. PACKMAN  2,929,130
MASS PRODUCTION PROCESSES
Filed July 24, 1953  23 Sheets-Sheet 3
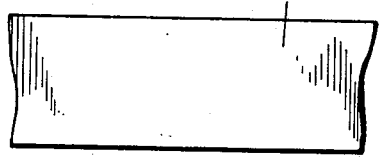
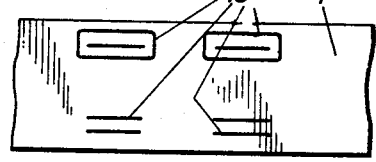
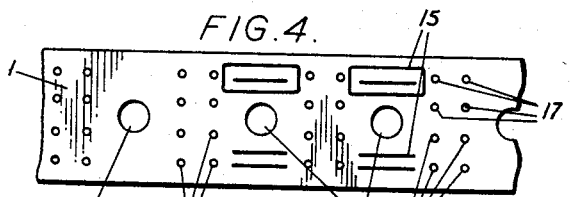
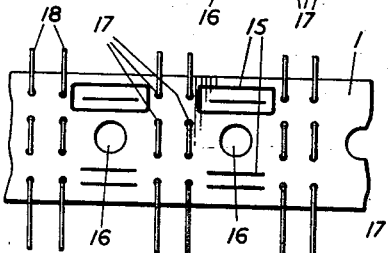
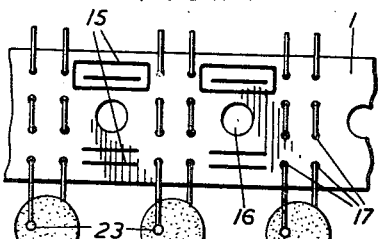
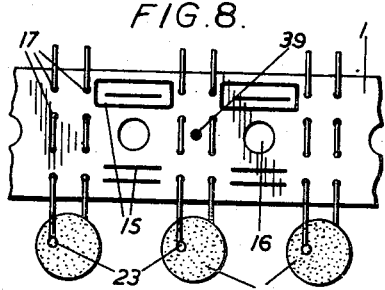
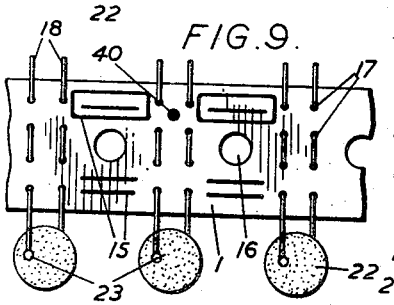
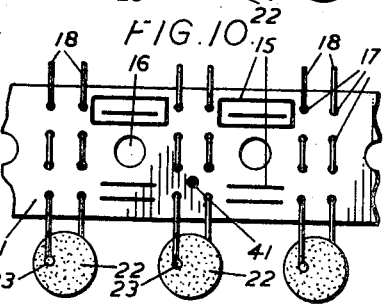
Inventor
Percival James Packman
By
Bailey, Stephens and Huettig
Attorneys March 22, 1960 P. J. PACKMAN 2,929,130
MASS PRODUCTION PROCESSES
Filed July 24, 1953 23 Sheets-Sheet 4
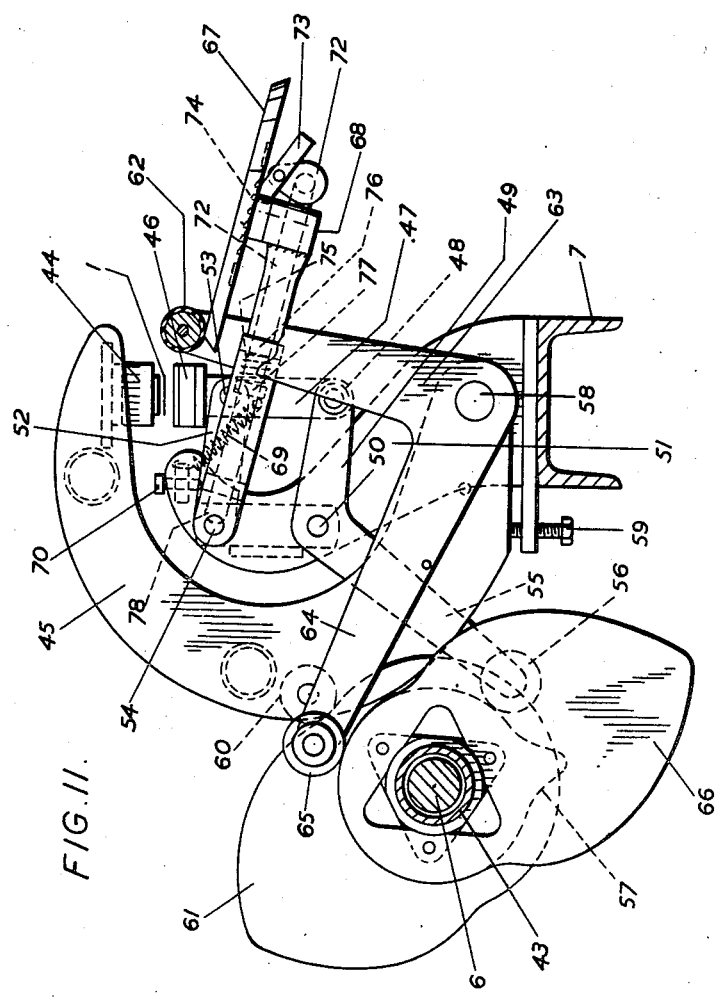
Inventor
Percival James Packman
By
Bailey Stephens and Huettig
Attorneys

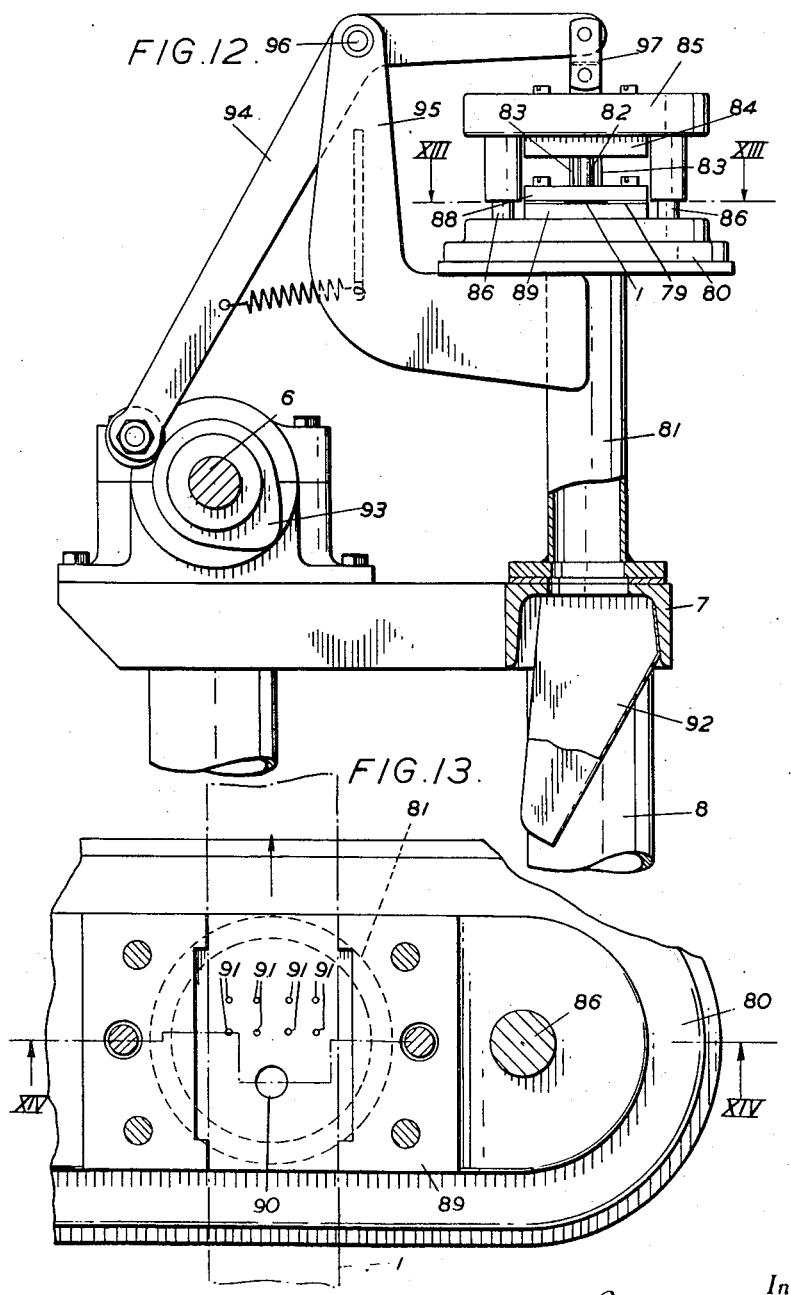

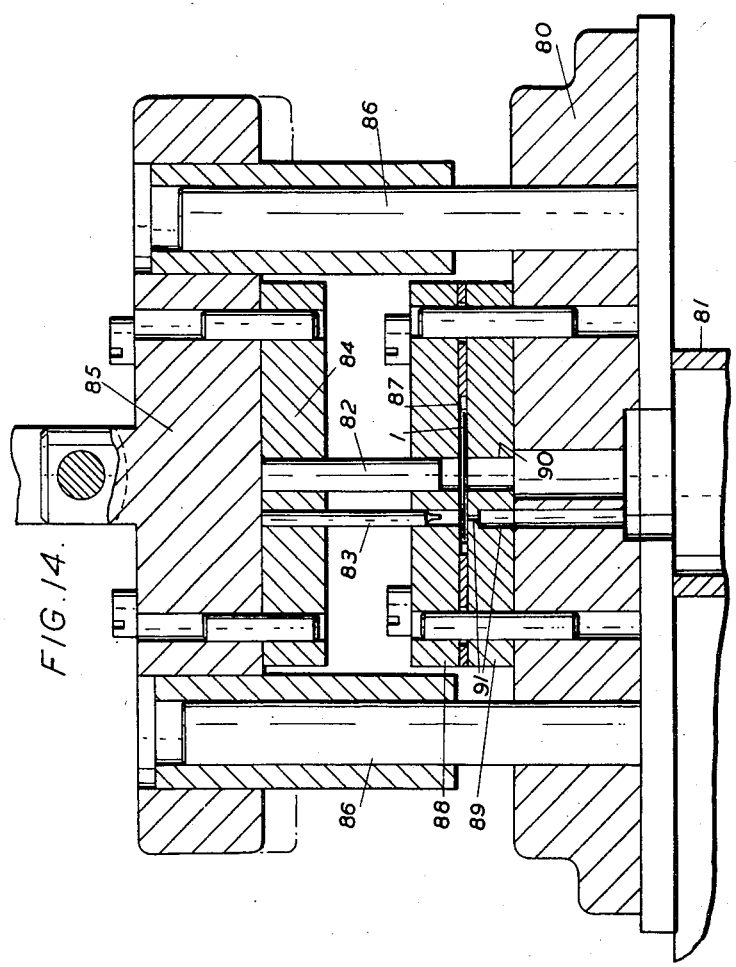

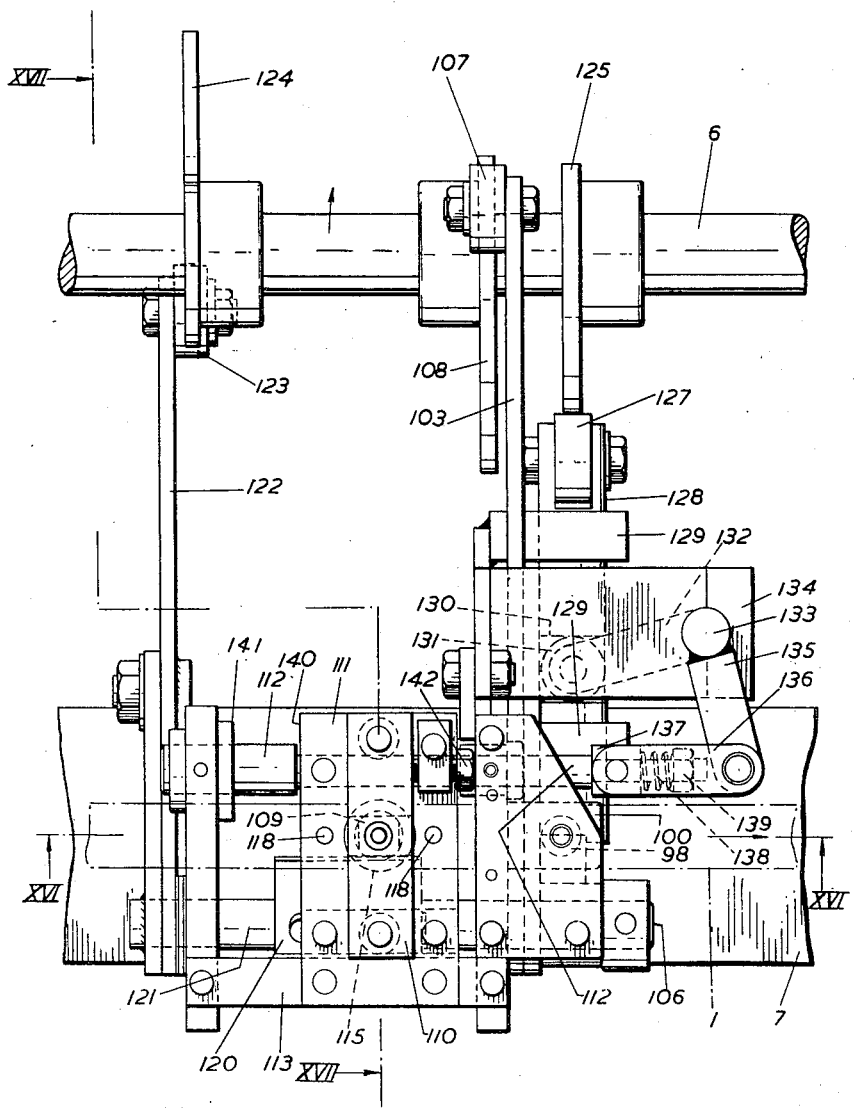

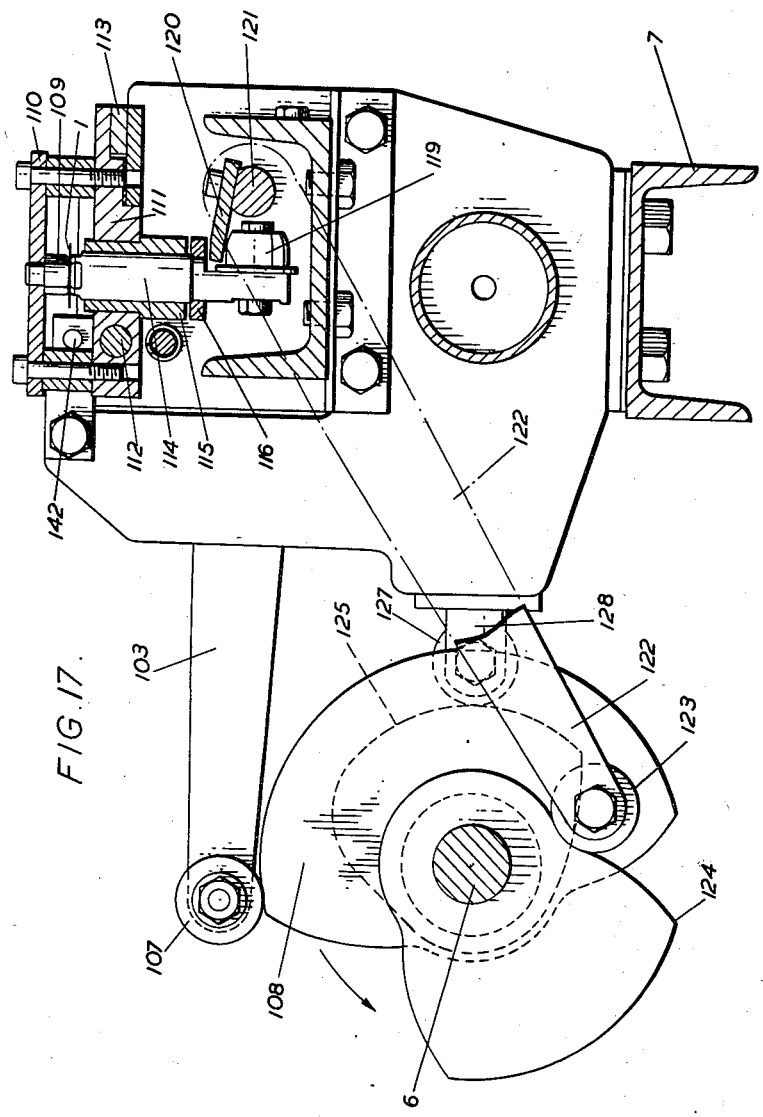

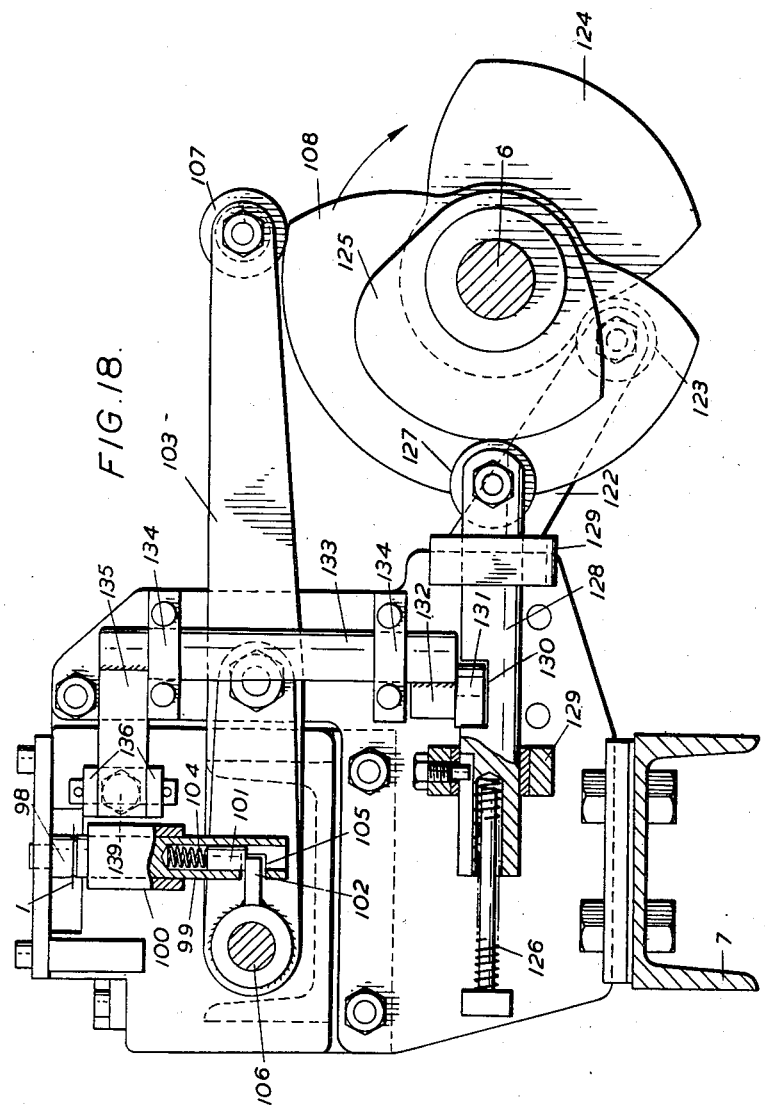

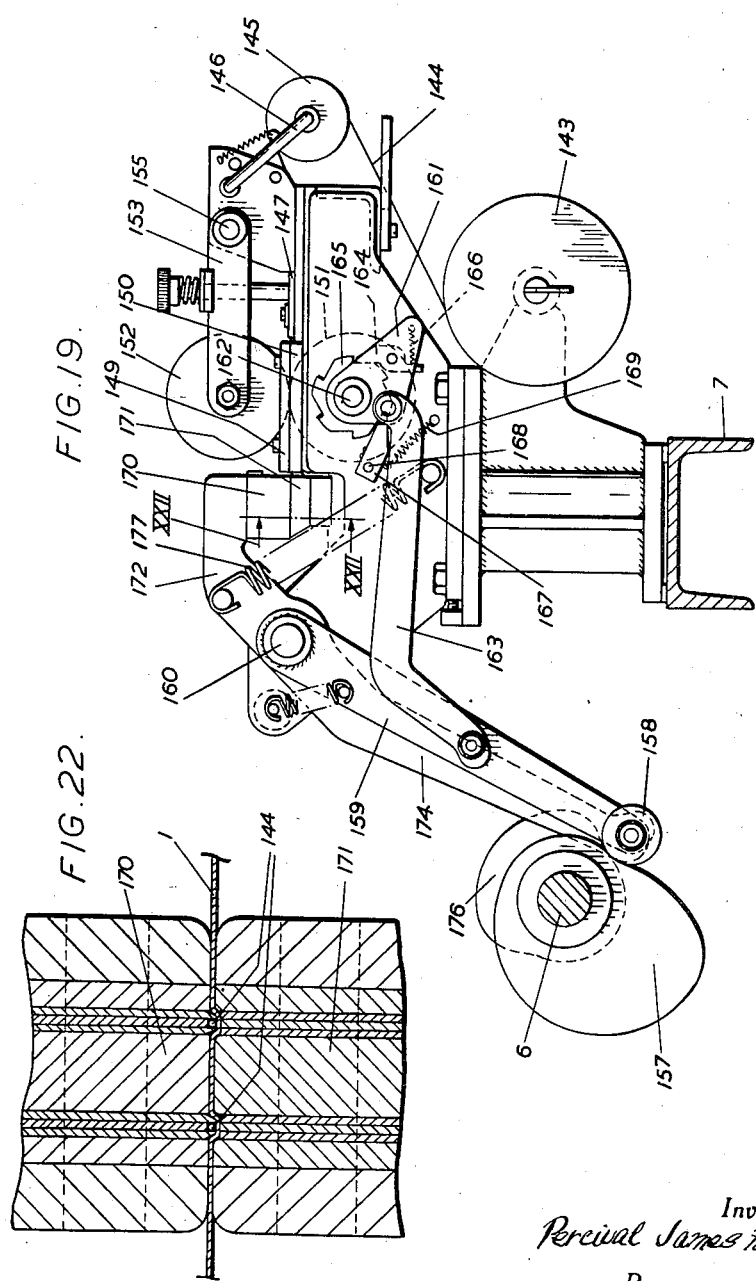

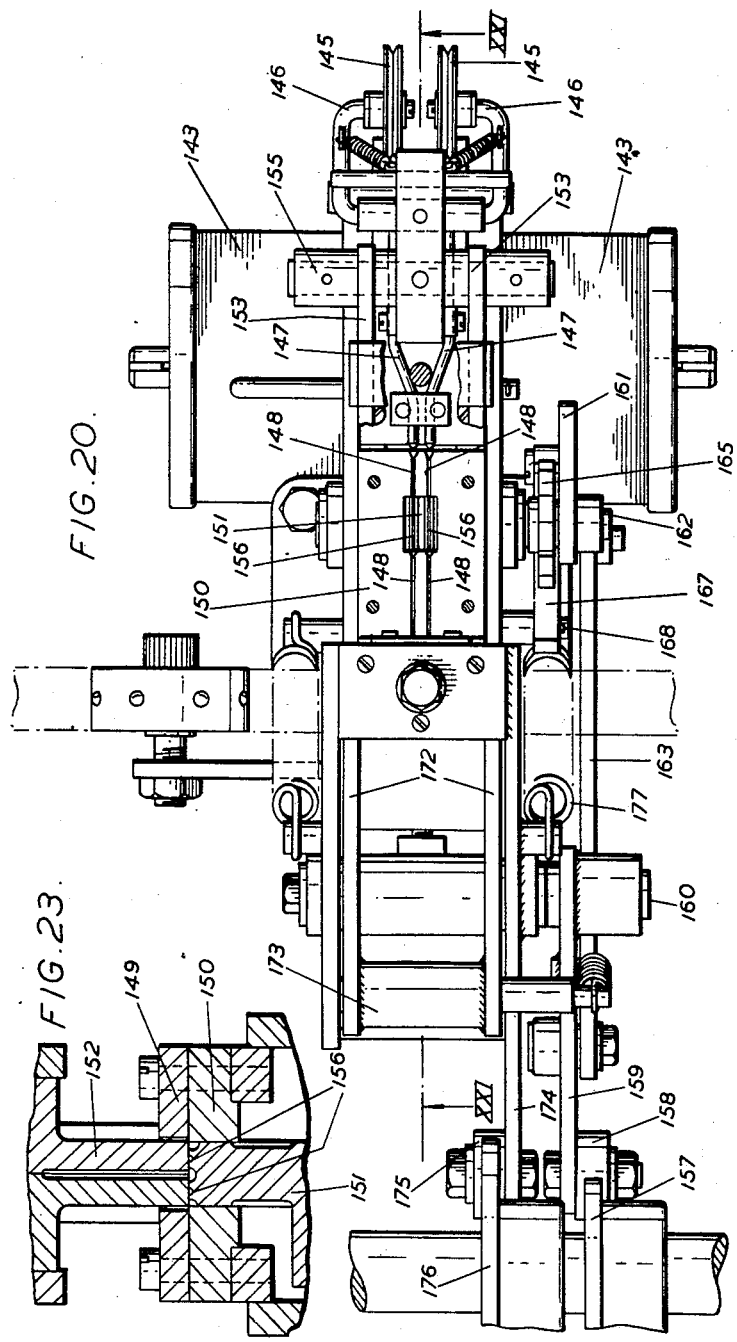

March 22, 1960  P. J. PACKMAN  2,929,130
MASS PRODUCTION PROCESSES
Filed July 24, 1953  23 Sheets-Sheet 13
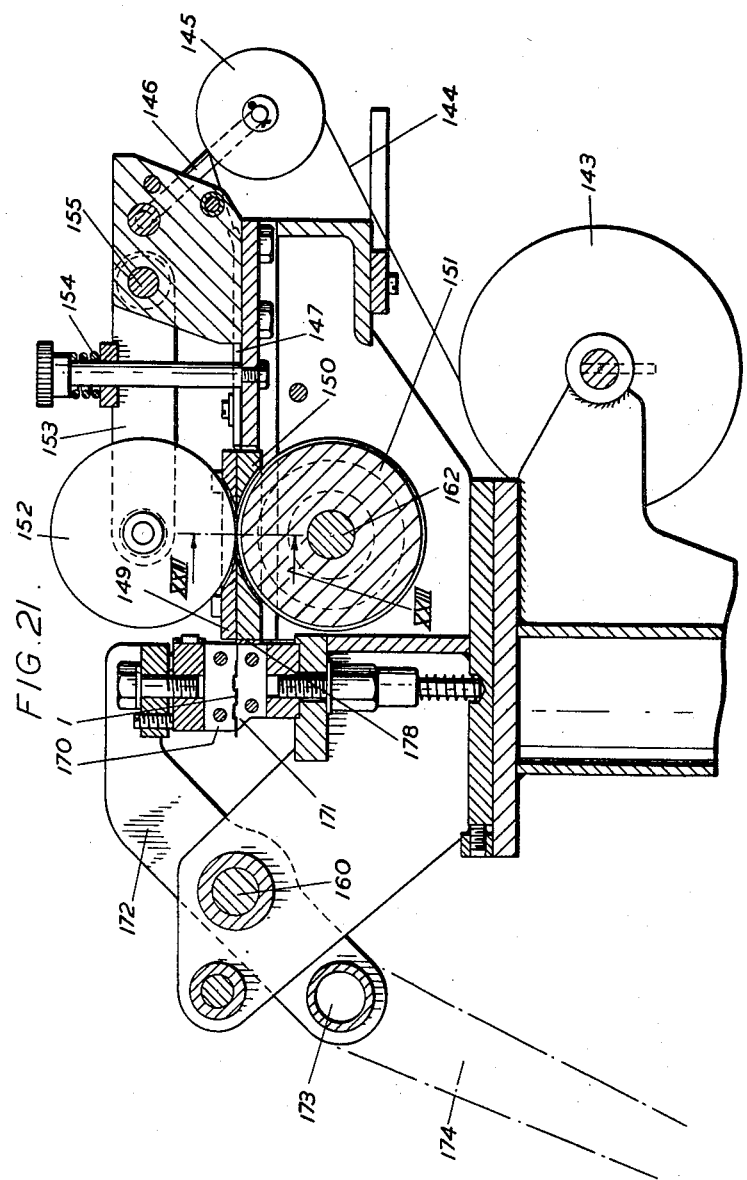
Inventor
Percival James Packman
By
Bailey, Stephens and Huettig
Attorneys March 22, 1960 P. J. PACKMAN 2,929,130
MASS PRODUCTION PROCESSES
Filed July 24, 1953 23 Sheets-Sheet 14

Inventor
Percival James Packman
By
Bailey, Stephens and Huettig
Attorneys

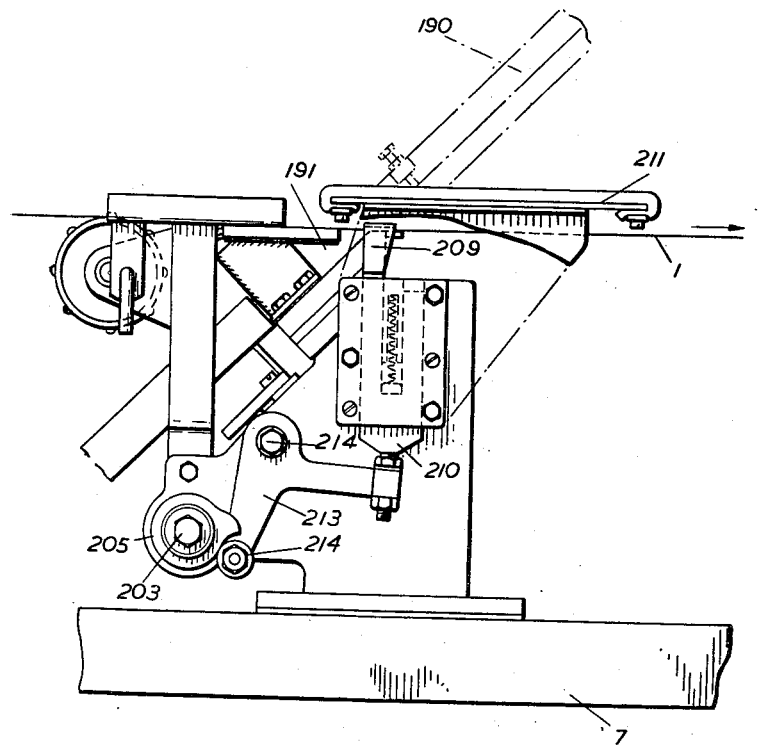
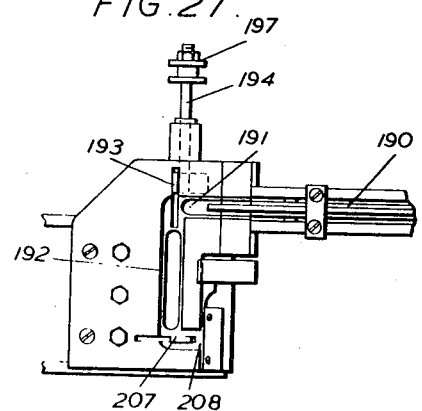

March 22, 1960  P. J. PACKMAN  2,929,130
MASS PRODUCTION PROCESSES
Filed July 24, 1953  23 Sheets-Sheet 16
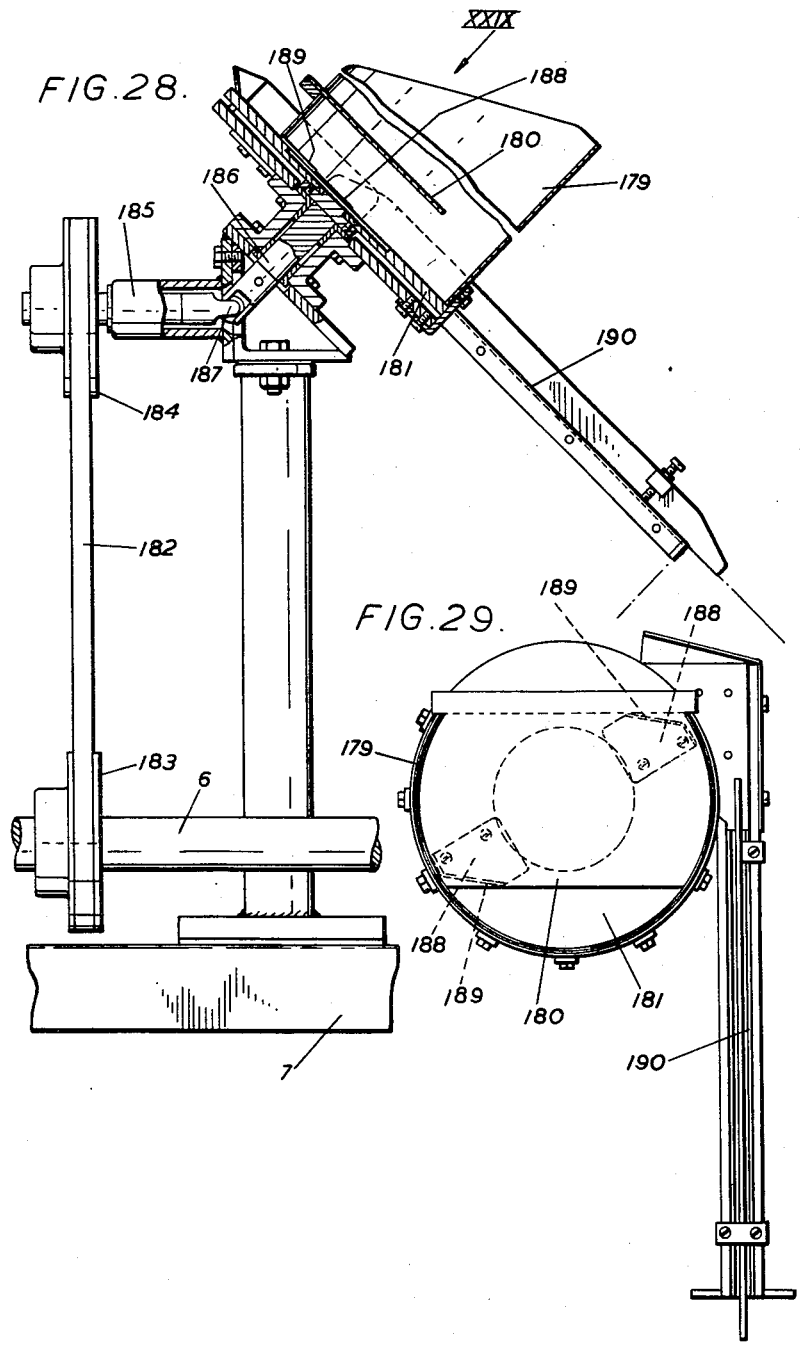
Inventor
Percival James Packman
By
Bailey, Stephens and Huttig
Attorneys

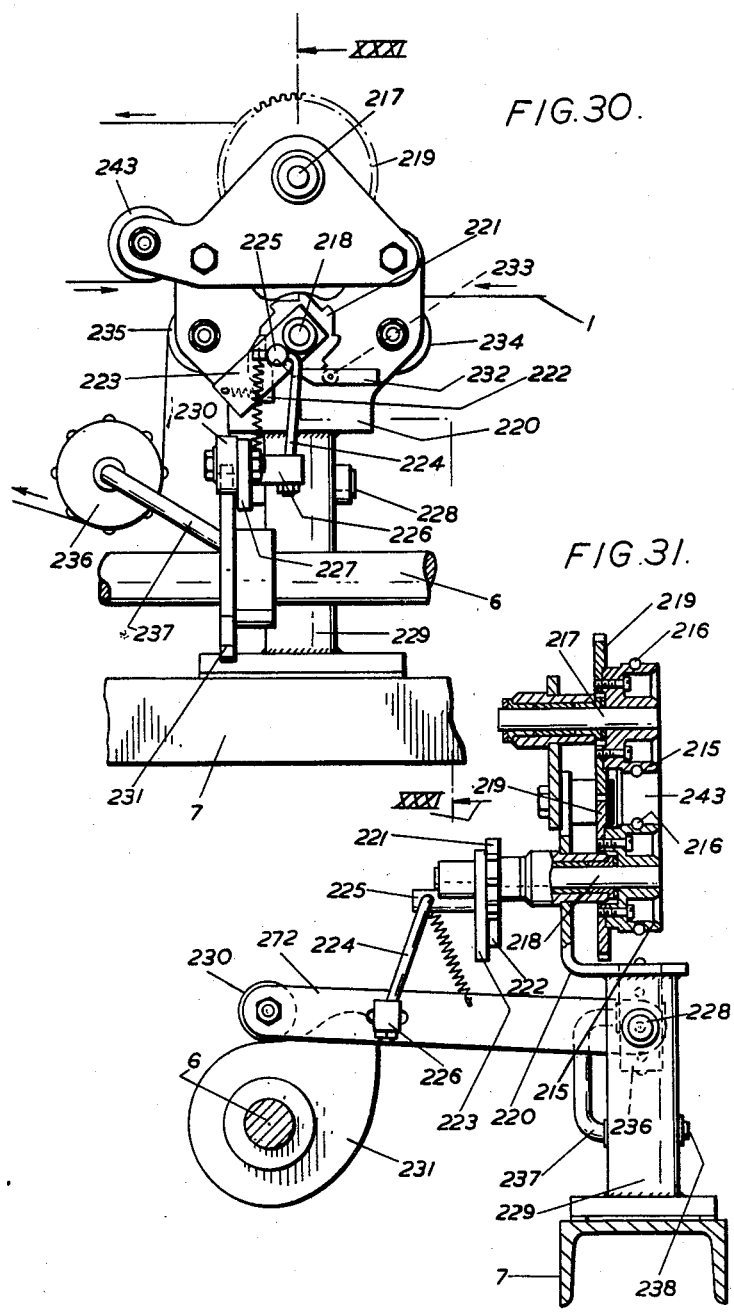

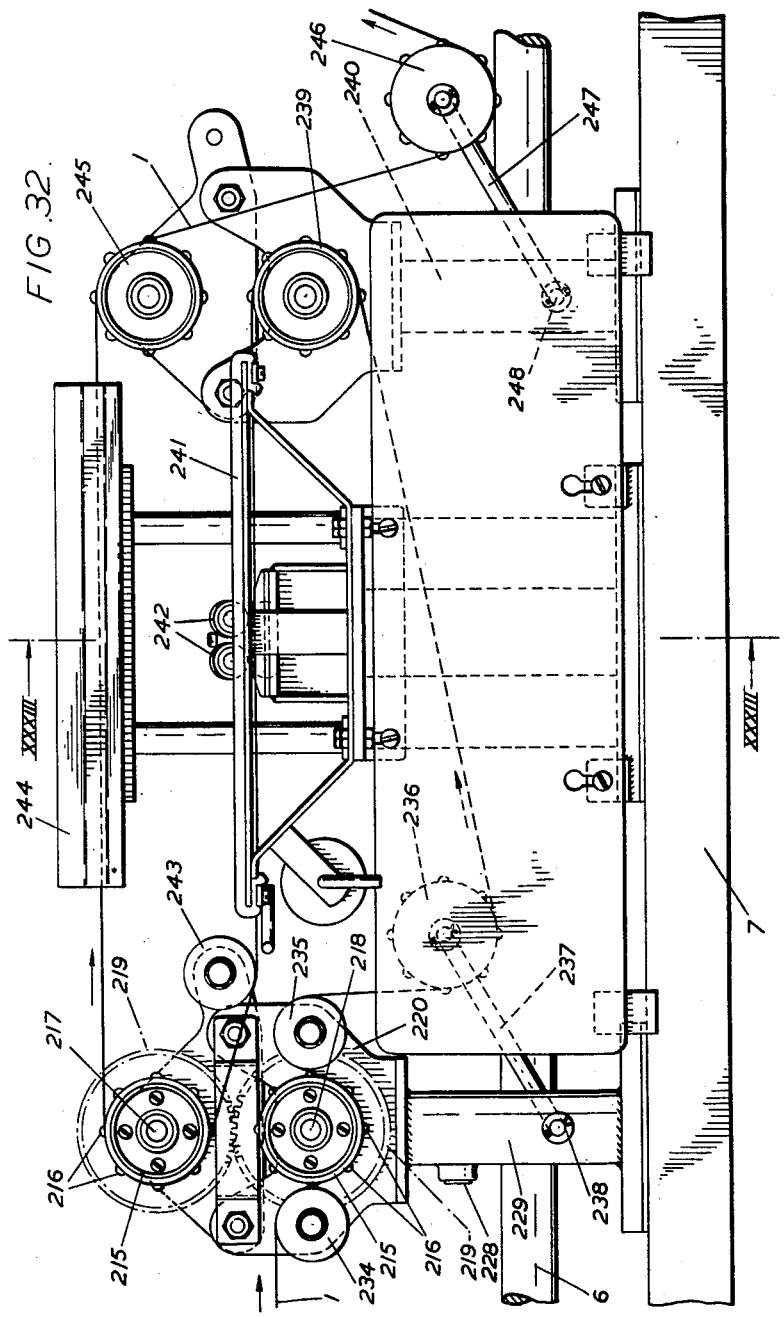

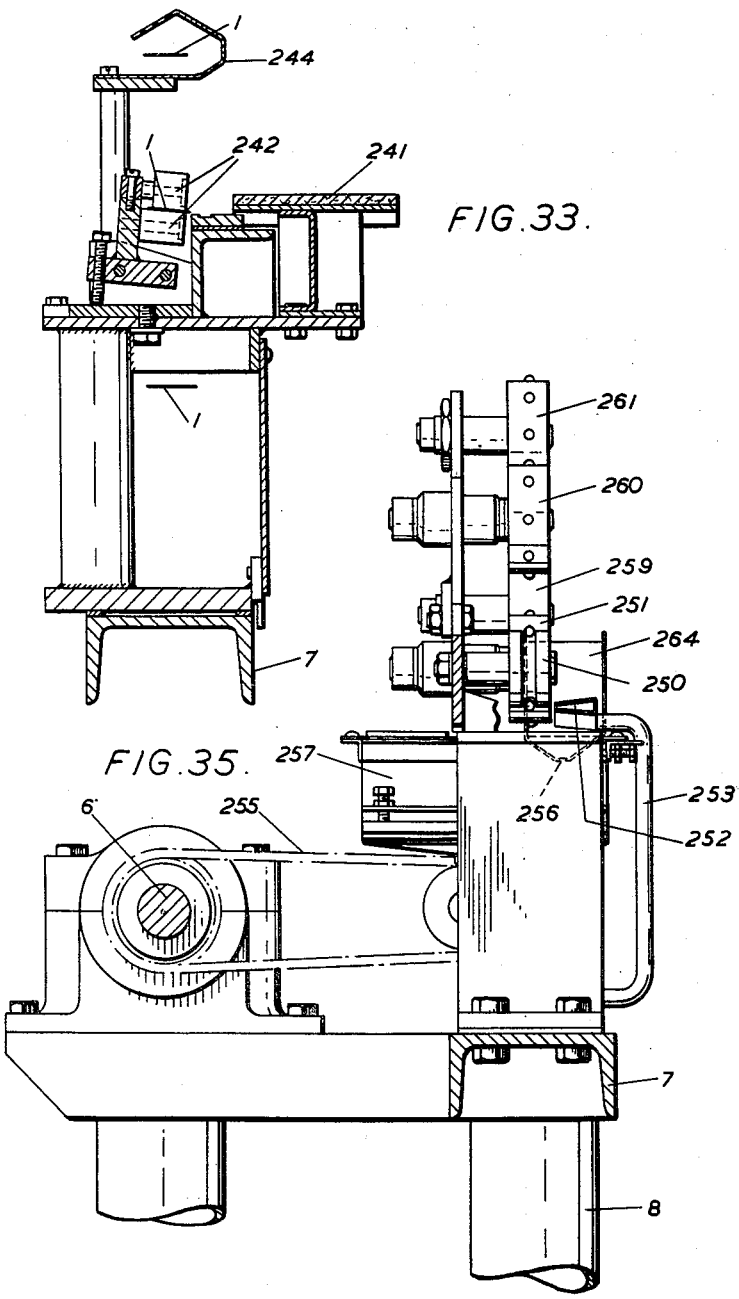

March 22, 1960 P. J. PACKMAN 2,929,130
MASS PRODUCTION PROCESSES
Filed July 24, 1953 23 Sheets-Sheet 20
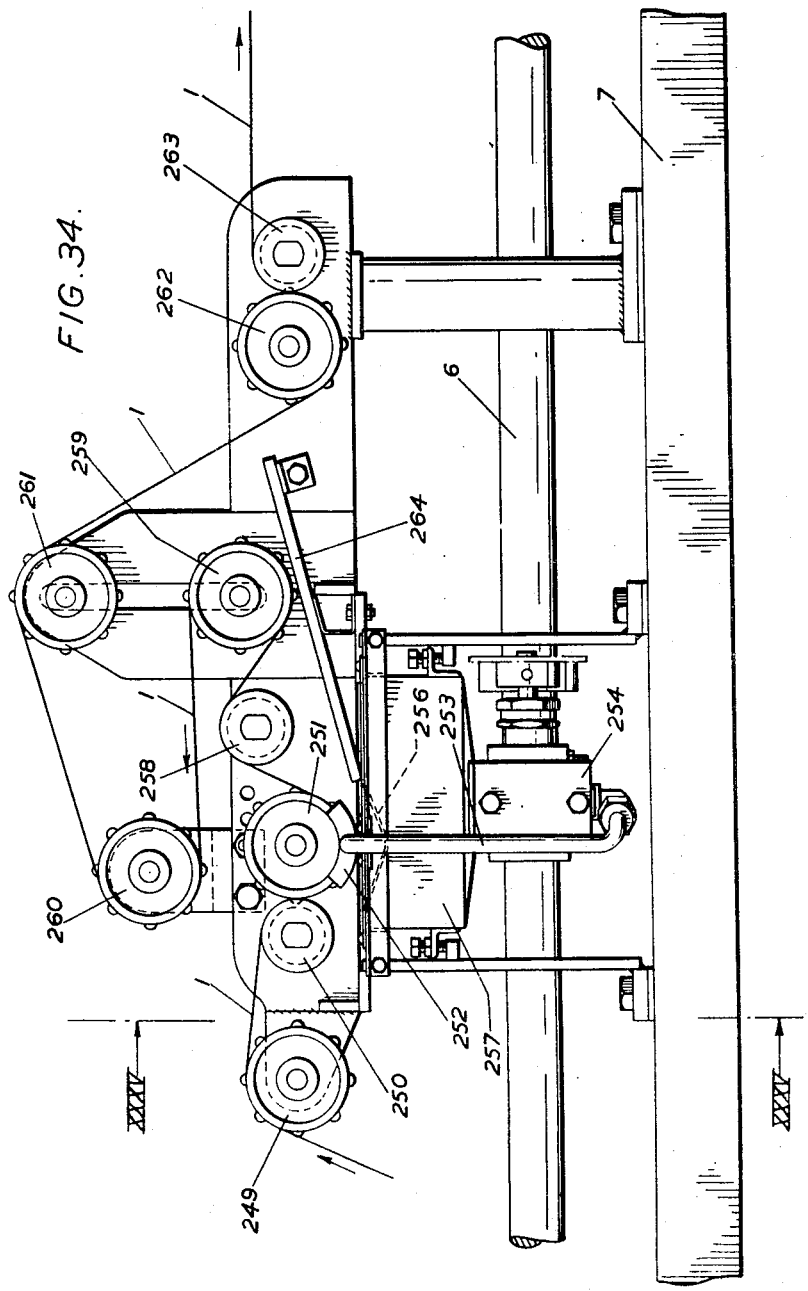
Inventor
Percival James Packman
By
Bailey, Stephens and Huettig
Attorneys March 22, 1960 P. J. PACKMAN 2,929,130
MASS PRODUCTION PROCESSES
Filed July 24, 1953 23 Sheets-Sheet 22
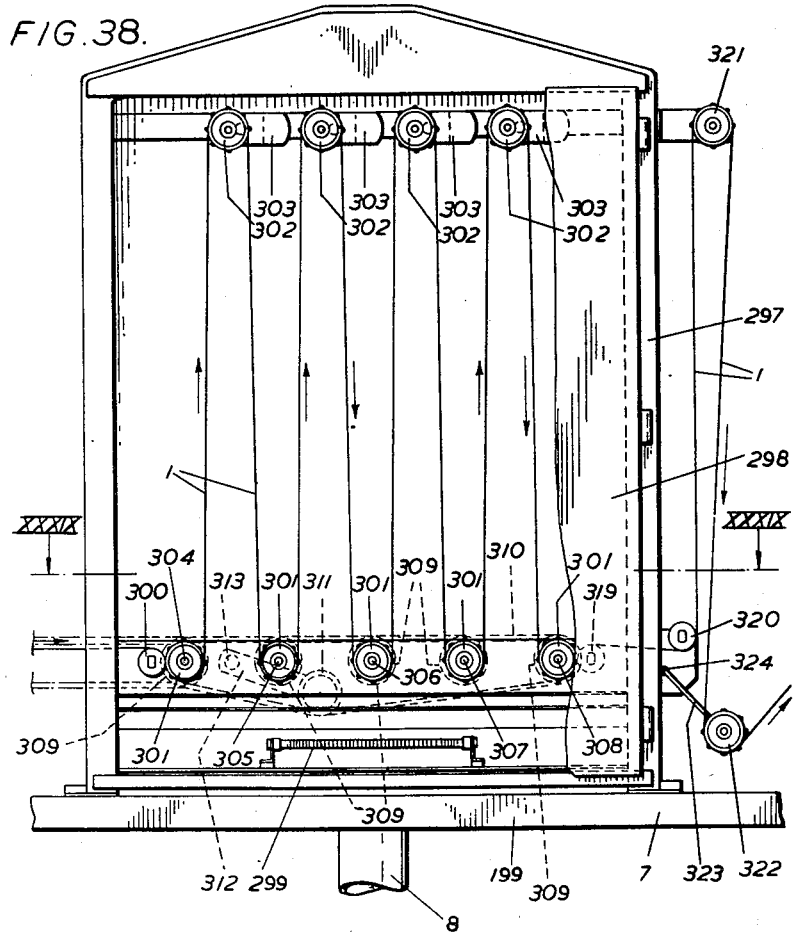
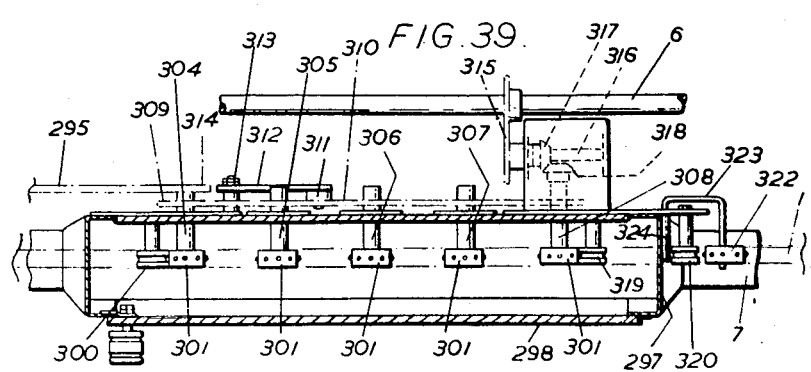
Inventor
Percival James Packman
By
Bailey, Stephens and Huettig
Attorneys

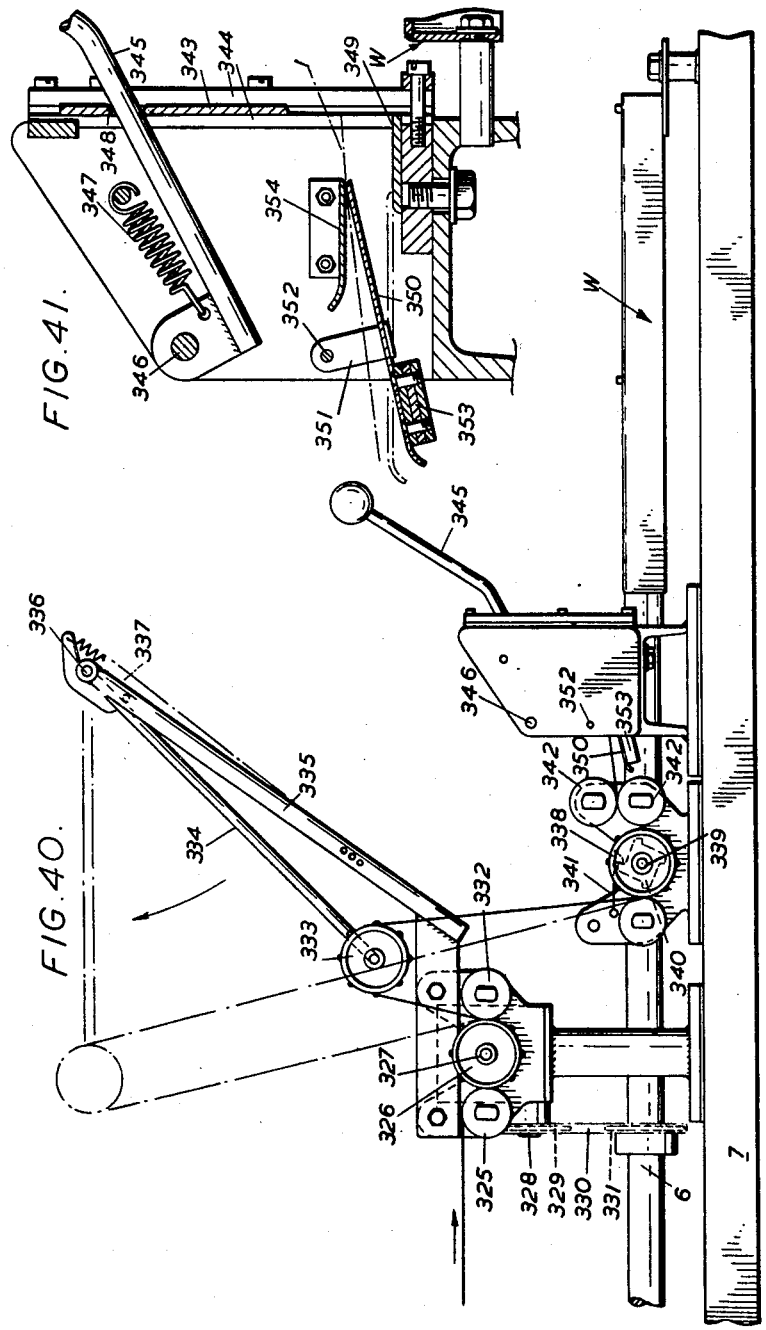

United States Patent Office 2,929,130
Patented Mar. 22, 1960

2,929,130

MASS PRODUCTION PROCESSES

Percival James Packman, Twyford, England, assignor to The Plessey Company Limited, Ilford, England, a British company Application July 24, 1953, Serial No. 370,014

Claims priority, application Great Britain July 28, 1952

6 Claims. (Cl. 29—25.42)

In the mass production of large numbers of small objects, problems often arise due to the difficulty of hoiding and manipulating the small parts and conveying them in an orderly manner from one point in the process to another. For instance, in the manufacture of small electrical components such as resistances or condensers, such as are used in wireless and television sets, one of the difficulties is to prevent the comparatively flexible leads, which are attached during the manufacturing process from becoming entangled if a number of the components are handled at a time. Moreover, the actual handling of such components during each of the operations involved in manufacturing, testing, coding, and packing itself presents a serious problem and can require a considerable amount of labour.

The present invention enables the small objects to be kept separate and mounted satisfactorily during manufacture as they proceed from one stage to another, right up to the point where they are counted and packed. In this way, no handling is required and it is an easy matter to present the work to any necessary holders which may be required for any particular process.

According to the invention therefore, in the manufacture of small objects in which the objects are assembled in or pass through a series of consecutive stages, the objects are attached individually to a strip of flexible material which is led through the stages of manufacture and which is driven so as to convey the objects one after the other through the said stages.

Preferably, to ensure accurate location of the various parts of each object in each stage, the strip is perforated and passes over sprockets. When it is desirable that the objects remain stationary during certain of the manufacturing stages, the strip may be moved through these stages intermittently in steps at appropriate intervals of time.

The objects may be attached directly to the strip by threading parts of the object, to which other parts may be attached during the stages of manufacture, through holes perforated in the strip, and when sprocket holes are also provided in the strip, it is desirable to ensure that the holes for the parts and the sprocket holes are accurately positioned in relation to each other so that the parts themselves are accurately located. Information may also be printed on the strips and the finished objects may be packed still attached to the strips. By using strips of electrically insulating material, electrical components may remain attached to the strip during testing and there is no danger to the operator. A suitable material for the strips is paper, which is sufficiently strong, is insulating, and is also inexpensive.

An example of a process according to the invention for the manufacture of small ceramic wireless condensers is shown in the accompanying drawings, in which:

Fig. 1a is a diagrammatic elevation of the left-hand end of the process, and Figure 1b is a diagrammatic elevation of the right-hand end of the process.

Figures 2 to 10 show the paper strip and condensers in different stages of their manufacture.

Figure 11 shows a side view of the printing machine B in Figure 1a.

Figure 12 shows a side view of the piercing machine C in Figure 1a.

Figure 13 is an enlarged detailed view in plan of the piercing machine as shown in Figure 12.

Figure 14 is a section of Figure 13 on the line XIV—XIV.

Figure 15 is a plan view of the combined strip gripper and feeder for advancing the strip intermittently as shown at D in Figure 1a.

Figure 17 is a section of Figure 15 on the line XVII—XVII.

Figure 18 is a view of the machine shown in Figure 15 as seen from the right.

Figure 19 is a side view of the wire cutting and feeding machine shown at E in Figure 1a.

Figure 20 is a plan view of the machine shown in Figure 19.

Figure 21 is a section of Figure 20 on the line XXI—XXI.

Figure 22 is an enlarged detail view showing the arrangement of the guides for ensuring that the wire is threaded through the paper strip correctly.

Figure 23 is an enlarged view of the feeding rollers shown in Figure 21 in section on the line XXIII—XXIII.

Figure 25 is a front elevation of the machine shown in Figure 24.

Figure 27 is a view of Figure 26 in the direction of the arrow.

Figure 28 is a view of the disc-supplying hopper for the machine G, as shown at H in Figure 1a.

Figure 29 is a view of Figure 28 in the direction of the arrow XXIX.

Figure 30 is a rear view of the feed sprocket and intermittent feed mechanism K in Figure 1a.

Figure 31 is a section of Figure 30 on the line XXXI—XXXI.

Figure 32 is a front elevation of the second soldering station L in Figure 1a, together with the intermittent feed mechanism K and guide sprockets M in Figure 1a.

Figure 33 is a section of Figure 32 on the line XXXIII—XXXIII.

Figure 34 is a front elevation of the mechanism for applying paint to the condensers, shown at N in Figure 1a.

Figure 35 is a section of Figure 34 on the line XXXV—XXXV.

Figure 36 is a front elevation of the drying oven O in Figure 1a.

Figure 38 is a front elevation of the curing oven P in Figure 1b.

Figure 39 is a section of Figure 38 on the line XXXIX—XXXIX.

Figure 40 is a front elevation of the feed sprocket and take-up apparatus shown respectively at F and Q at two points in Figure 1b, together with the guillotine shown on the extreme right of Figure 1b.

Figure 41 is an enlarged section of the guillotine.

Figure 16:
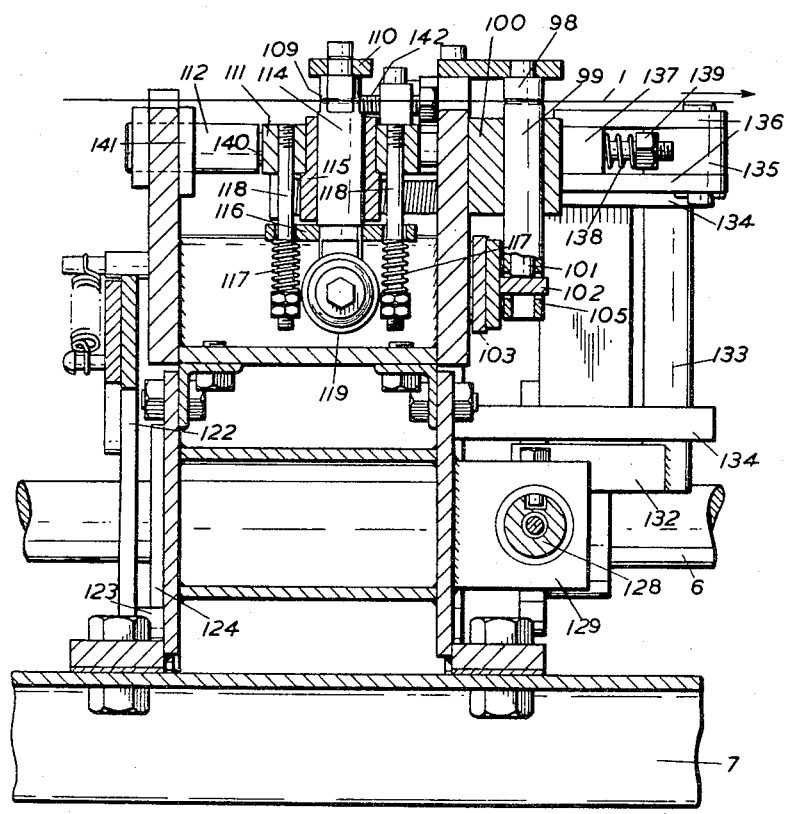
Figure 16 is a section of Figure 15 on the line XVI—XVI.

Referring to Figures 1a and 1b and Figures 2 to 10, a strip of paper 1 one-inch wide and initially without perforations as shown in Figure 2, is drawn from a stock reel 2 shown in Figure 1a and after passing round guide rollers 3, 4, 5, passes first through the printing machine B driven through back gearing A.

The strip 1 is drawn from the stock reel 2 by the intermittent gripper feed D which, in the example, makes thirty feeding strokes of one inch each in each minute.

After leaving the printing machine B, the paper strip 1 passes through the piercing machine C which provides one sprocket hole 16 at each inch with eight pin holes 17 symmetrically placed as shown in Figure 4 between each pair of sprocket holes.

At E in Figure 1a, suitable lengths of tinned copper wire for the condenser leads are threaded through the holes 17 as shown at 18 in Figure 5 and then cut off. The leads 18 are fed through in pairs as shown to form the leads of the finished condenser. In the next stage the condensers, which are ceramic discs half an inch in diameter coated on each face with silver, are fed one at a time from a hopper H to the mechanism G which places the discs 22 beneath the projecting ends of the leads 18, and then pushes the discs 22 upwards and sideways between the end of the pairs of leads so that the disc lies with a lead in contact with each face, whereupon the leads are soldered to the faces as shown at 23 in Figure 6, one lead being soldered at G and the other at the second soldering station L after inversion at the power driven sprocket at K. The strip then passes again over a power driven sprocket at K and over a sprocket at M, where the movement of the strip becomes continuous, to the painting machine N. After the painting machine N, the strip passes through the drying oven O and the curing oven P to the driven sprocket F where the feed is converted into a five inch movement every ten seconds which is suitable for the flash testing equipment R. The feed is now changed to a one inch intermittent feed every two seconds for the capacity testing apparatus S and T, the details of which form no part of the present invention. From there the strip passes to a coding mechanism U and counter V after which it passes over the driven sprocket F to the guillotine Q through which it is drawn onto a packing table W at the will of the operator.

The completed condensers and strip after painting is shown in Figure 7. Figure 8 shows the preferred method of marking to signify a reject from the flash test by means of a central spot 39. A high capacity reject from the capacity test is marked by a spot as shown in Figure 9 and a low capacity reject by a spot 41 as shown in Figure 10.

The units A–W carrying out the various operations are all mounted on a bed 7 of inverted channel section running the length of the process and supported at intervals on pillars 8, and the main drive shaft 6 runs the whole length of the machine behind and just above the level of the bed 7, being driven by a chain drive 9 from a gear box 10 driven by a belt 11 from an electric motor 12. The gear box 10 is provided with a clutch not shown, which is operated by an arm 13, linked to a clutch operating rod 14 which runs along the front of the machines from end to end and thus enables an operator at any point to start or stop the machinery.

At the left hand end of the machine, as seen in Figures 1a, 1b provision is made for a spare stock roll of paper strip 42 which can be brought into use as soon as the roll 2 is exhausted.

The gripper feed mechanism D moves the paper strip 1 intermittently an inch at a time since the condensers are assembled at inch intervals on the strip. The information provided on the strip by the printing machine B is only required at every fifth condenser and therefore the cam shaft 43 (Figure 11) for the printing machine is driven from the main shaft 6 which passes through the shaft 43, through the five to one reduction back gearing A. In Figure 11, the paper strip 1 passes between the upper type block 44 carried by a pair of arms 45 and a movable printing pad 46 at the top of a member 47 which is pivoted at 48 to a crank 49. The crank 49 is pivoted at 50 to a pillar 51, and the member 47 is held upright by a link 52 pivoted to the member 47 at 53 and to the pillar 51 at 54. The crank 49 is part of a double-armed lever, the other arm 55 of which ends in a roller 56 which runs on the surface of a cam 57 keyed to the cam shaft 43. Rotation of the cam 57 causes the printing pad 46 to rise, pressing the strip 1 against the type block 44.

The arms 45 are pivoted on the shaft 58 and are located so that the type block is immediately above this strip 1 by means of the adjustable stop 59. The arms 45 carry a pivoted roller 60 which rides on the surface of a cam 61 on the shaft 43. As this cam rotates it causes the arms 45 to swing clockwise from the position shown in Figure 11, so that the surface of the type block moves over an inking roller 62 which is carried on one arm 63 of a bellcrank pivoted on the shaft 58, and the other arm 64 of which ends in a roller 65 which bears on the surface of a third cam 66 on the shaft 43. The arms 45, 55 and 64 are biased by springs, not shown, so as to maintain the rollers 56, 60 and 65 in contact with their respective cams.

The roller 62 is moved periodically by the cam 66 across a circular inking plate 67 pivoted at the end of an arm 68 which is pivoted to the stationary pillar 51 by the shaft 54 and is biased upwards by a spring 69. Except during the actual inking movement, the roller 62 is kept clear of the edge of the inking plate 67 by the adjustable stop 70 which bears upon the arm 68. The arm 68 carries a plunger 71 on the end of which is a bracket 72 which carries a pawl 73 which is biassed by a spring, not shown, into engagement with ratchet teeth 74 on the underside of the inking plate 67. The plunger 71 is biassed to the left of Figure 11 by a spring 75 acting between an abutment 76 on the arm 68 and a collar 77 on the plunger 71. When the member 45 moves to carry the type block 44 over the inking roller 62 it also engages the rear end 78 of the plunger 71 forcing it to the right against the spring 75, so that on the return stroke spring 75 causes the pawl 73 to advance the inking plate by one ratchet tooth.

The piercing machine C is shown in Figures 12 to 14 and consists of a stationary lower die 79 mounted on a table 80 carried by a stationary hollow pillar 81 and a vertically movable set of punches 82, 83 carried by a block 84 mounted on a head piece 85 which is arranged to slide up and down on vertical guides 86 carried by the table 80. The paper strip 1 passes through a slot 87 formed between the upper and lower halves 86, 89 of the die 79, these two halves having holes 90, 91 through which the punches 82, 83 pass. The punch 82 pierces the strip 1 centrally as shown in Figure 13 and forms the sprocket hole 16. There are eight similar punches 83 which form the holes 17 for the wire leads. The punched out portions of the paper strip fall through the column 81 and are led away by the chute 92. The head 85 is moved up and down at the appropriate moment by the cam 83 mounted on the shaft 6 and which operates a bell-crank 94, pivoted at 96 to a bracket 95, fixed to the pillar 81. The bell-crank is linked to the head 85 by the short link 97.

The gripping and feeding tool is shown in Figures 15 to 18. This tool acts to advance the paper strip 1 in steps of one inch, thirty times per minute and to ensure that there is no danger of the strip being drawn backwards by the printing machine or piercing tool in the intervening stationary periods. The gripper is seen best in Figures 16 and 18 and consists of a stationary upper anvil 98 beneath which the strip 1 passes, and a movable plunger 99 arranged to slide vertically in a stationary guide 100. The lower end of the plunger 99 houses a spring loaded slider 101 which is caused to bear upon a projection 102 carried by an arm 103 by a spring 104. The projection 102 extends through a slot 105 in the plunger 99 and is formed close to the pivot point 106 of the arm 103, the free end of which carries a roller 107 which rides on the surface of a cam 108 carried by the shaft 6. Thus when the cam 108 raises the arm 103, the spring 104 causes the plunger 99 to grip the strip resiliently against the anvil 98.

The feeding mechanism comprises a similar anvil 109 carried by a bridge piece 110, mounted on a carriage 111, arranged to slide in the direction of the axis of the paper strip on slides 112, 113. This carriage also carries a corresponding lower plunger 114 in a guide 115 and provided with a cross-head 116 which is urged upwards by springs 117 on rods 118, mounted on the carriage 111. The lower end of the plunger 114 also carries a roller 119 arranged beneath a ledge piece 120 secured to a shaft 121 to which an arm 122 is secured which carries a roller 123 riding on the surface of a cam 124 on the cam shaft 6. The ledge 120 extends in the direction of the strip sufficiently to ensure that whatever the position of the carriage 11 on the slides 112, 113, the ledge 120 extends over the roller 119 as shown in Figure 17. Thus, when the cam 124 turns the arm 122 anti-clockwise as seen in Figure 17, the plunger 114 is moved downwards against the spring 117 and the strip 1 is released.

The carriage 111 is reciprocated in the direction of the paper strip 1 by a cam 125 on the shaft 6. The roller 127 on the end of a plunger 128 (seen best in Figure 18) is caused to bear upon the cam 125 by a spring 126. The plunger 128 moves in guides 129 and is slotted at 130 transversely to take a roller 131, pivoted on the end of a crank arm 132 secured to a vertical shaft 133 mounted in brackets 134. To the upper end of the shaft 133, an arm 135 is secured which is connected to the guide 112 by a link 136 which is pivoted to a collar 137 which can slide on the guide 112 against a spring 138 which abuts on a nut 139 on the guide 112. As seen in Figures 15 and 16, the movement of the carriage 111 to the left is limited by the abutment of the face 140 of the carriage 111 with the stop 141 on the stationary part of the machine. The lost-motion linkage provided by the sliding collar 112 enables the right hand limit of movement of the carriage 111 to be adjusted accurately by the screw stop 142, so that, despite any discrepancy in the dimensions of the linkage and the cam 125, the actual feed motion imparted to the strip 1 can be accurately determined.

The function of the wire feed machine E is to feed the wire for the two leads to which the condenser is to be soldered through the perforations 17 of the paper strip 1 and then cut off the appropriate lengths. As seen in Figures 19 to 22, the wires 144 are driven from a pair of bobbins 143, and pass round guide pulleys 145 on spring loaded arms 146 into guide tubes 147 which remove any kinks remaining after passing round the pulleys 145 and lead the wires close together to channels 148 in guide plates 149, 150. These two plates are cut away as shown in Figure 21, to permit a driven feed roller 151 and an upper pressure roller 152 to engage and grip the wires. The upper pressure roller 152 is carried by an arm 153 spring loaded downwards by a spring 154 and pivoted at 155. As seen in Figure 23, the upper roller is plain and the lower roller 151 is grooved at 156 to accommodate the wires so that they project sufficiently to be gripped between the two rollers. The roller 151 is advanced intermittently to feed sufficient length of each wire for one lead by a cam 157 on the shaft 6 which engages a roller 158 on an arm 159, pivoted at 160, which arm is connected to a pawl plate 161 freely rotatable on the shaft 162 of the feed roller 151, by a link 163. The pawl plate 161 carries a pivoted pawl 164 which is biassed into engagement with a ratchet wheel 165 of the shaft 162 by a spring 166. A second pawl 167 is also provided, pivoted at 168 to the stationary arm of the machine and biassed into engagement with the ratchet wheel 165 by a spring 169 so as to prevent the pawl 164 dragging the ratchet wheel 165 backwards. The wires 144 are thus drawn off the spools 143 and fed through the guide channels 148 intermittently in appropriate lengths.

The guide channels lead to a pair of dies 170, 171, seen best in Figures 21 and 22, the lower of which 171 is stationary while the upper 170 is mounted on the end of a pair of arms 172 secured to a shaft 173 to which is secured an arm 174 provided with a follower roller 175 bearing on a cam 176 on the shaft 6. As seen in Figures 21 and 22 the opposed surfaces of the dies 170 and 171 are such that they formed prolongations of the guide channels 148 and also crimp or shape the paper strip 1, as shown, so that the ends of the wires 144 are threaded correctly through the eight holes 17 in the strip as shown in Figure 5. When the wires have been threaded in this way, the cam 176 raises the die 170 against the spring 177, causing a guillotine blade 178 attached to the die 170 to cut off the lengths of wire 18 threaded through the strip 1.

Figure 24:
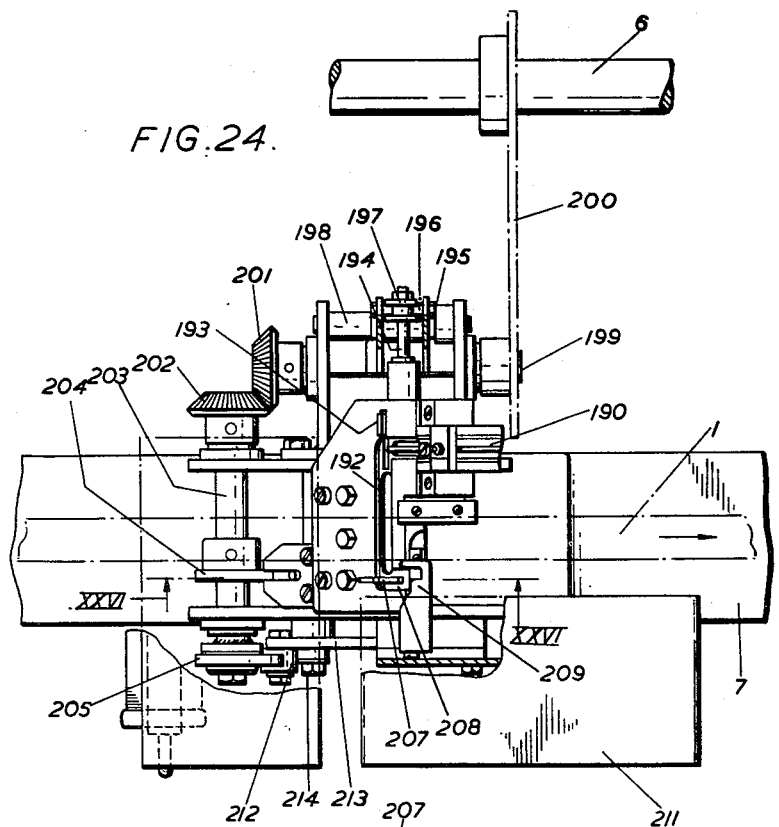
Figure 24 is a plan view of the condenser disc feeding machine G in Figure 1a, also showing the first soldering station.
Figure 26:
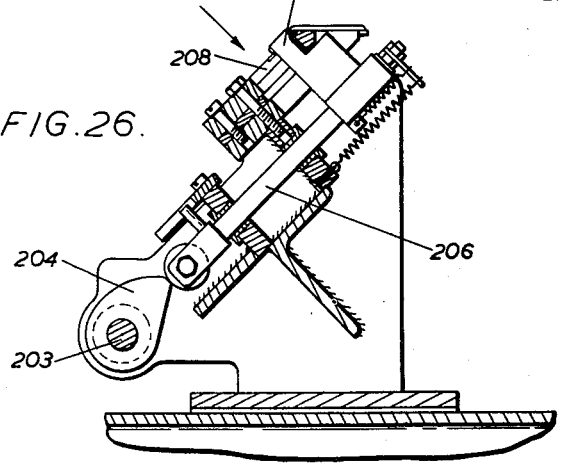
Figure 26 is a sectional view of Figure 24 on the line XXVI—XXVI.

Figures 24 to 27 show the apparatus G for placing the condenser discs 22 between lead wires 18 and Figures 28 and 29 show the apparatus H for supplying the discs one at a time to the apparatus G. In Figures 28 and 29, the discs 22 are stored in a hopper 179 having a baffle 180 which ensures that the discs 22 only reach the lower part of the feed disc 181 which is driven continuously from the shaft 6 by the belt 182 running round pulleys 183, 184 and driving a shaft 185 which drives the shaft 186 to which the disc 181 is secured through a universal joint 187. The disc 181 is mounted at an angle as shown in Figure 28, and carries deflector plates 188 which have shallow ridges 189 so that as they rotate they pick-up a succession of condenser discs 22 lying against the surface of the disc 181, the ridges 189 being sufficiently narrow to ensure that two discs are not picked up side by side. The feed disc revolves anti-clockwise, as seen in Figure 27, so that the discs run off the ridges 189 at a point half way up the right hand side, as seen in Figure 29, and enter a guide chute 190 which slopes down, as seen in Figure 28, to the positioning mechanism G. The lower end of this chute 190 is shown in Figures 24, and 25 and 27, and it will be seen that the chute delivers the discs 22 behind the strip of paper 1 and they pass downwards through the channel 191 (Figure 27) which is a continuation of the chute 190 into a horizontal channel 192 which runs forward under the paper strip 1. The discs are pushed in succession along the channel 192 by a finger 193 carried by a plunger 194 which is caused to reciprocate by a forked arm 195 having pins 196 engaging in a grooved collar 197 on the plunger 194 and pivoted on a shaft 198. This arm is caused to oscillate on the shaft 198 by a cam, not shown, on an intermediate shaft 199 which is driven by a chain 200 from the main shaft 6. The shaft 199 also carries a bevel wheel 201 meshing with a similar bevel wheel on the shaft 203 running from front to back of the machine beneath the paper strip 1 and carrying a pair of cams 204, 205. The cam 204 operates a push rod 206 which has a second feed finger 207, which carries the discs 22 from the channel 192 up a channel 208 which positions it between the two leads 18 projecting from the strip 1. A clamping member 209 carried at the top of a spring loaded slider 210 is then lowered on to it as shown in Figures 24, 25, the clamping member being cut away so as to leave the end of the upper lead exposed for soldering, and the operator then performs this operation resting his hand on the soldering table 211. The slider 210 is operated by the cam 205 as seen in Figure 25. The cam engages a follower roller 212 on a bell-crank 213, 214, the other arm of which carries an adjustable stop in engagement with the slider 210.

In effect the mechanism 4 pushes each disc 22 up at an angle of 45 degrees between the end of a pair of leads and the clamping member 209 then turns the disc into a horizontal plane and clamps the leads to it while the first lead is soldered.

The strip 1 with the leads in place and with the upper lead soldered to the disc then passes on to the second soldering position shown in Figure 32. For convenience the strip is turned over so that the unsoldered lead comes on top of the condenser disc 22 but before reaching this position the strip passes over the lower of the pair of intermittently actuated feed sprockets shown on the left of Figure 32 and in detail in Figures 30 and 31. Each sprocket consisting of a drum 215, in the circumference of which ball bearings 216 are set at appropriate intervals to engage the sprocket holes 16 in the paper strip. The drums 215 are carried on shafts 217, 218 and each drum also carries a spur wheel 219 which meshes with the similar spur wheel 219 of the other drum. The shafts 217, 218 are carried on a bracket 220 and the shaft 218 is provided with a ratchet wheel 221 which is engaged by a spring loaded pawl 222 carried on an arm 223 pivoted on the shaft 218. This arm is actuated by a push rod 224, one end of which is turned at right angles and passes through a pillar 225 on the arm 223, the other being secured to a bracket 226 on an arm 227 pivoted at 228 to the main supporting pillar 229 and carrying a roller 230 which rides on the surface of a cam 231 on the shaft 6. A pawl 232 is provided on a stationary pivot 233 to engage the ratchet wheel 221 and prevent it moving backwards. Thus both sprocket wheels 215 are driven at the same speed in opposite directions.

The paper strip 1 is led over an idle roller 234, round the lower part of the lower sprocket wheel 215 and then over another similar idle roller 235, after which it passes round an idle sprocket wheel 236 pivoted at the end of an arm 237 pivoted to the pillar 229 at 238. The strip then passes to an idle sprocket wheel 239 on a pillar 240 where its direction is reversed as it passes backwards (to the left in Figure 32) behind the rear edge of the soldering table 241 (see Figures 32 and 33). The leads are held pressed to the discs at the moment of soldering by the freely running rollers 242. After the soldering operation has been performed, the paper strip passes round a guide roller 243 and then is reversed around the upper driven sprocket 216 after which it passes through the protecting shield 244.

The strip then passes over the idle sprocket 245 and round a sprocket 246 mounted on the end of an arm 247 pivoted to the pillar 248. This sprocket 246 enables the feed of the strip 1 to be changed at this point from an intermittent movement of one inch every two seconds to a continuous feed of thirty inches per minute, the sprocket 246 rising and falling to maintain the strip under tension.

The strip now conveys the condensers to the painting machine N shown in Figures 34 and 35. After passing over an idle guide sprocket 249 and a guide roller 250, the strip passes round the lower side of a sprocket 251 opposite a curved mouth 252 mounted on the upper end of a pipe 253 through which paint is pumped by a pump 254 driven from the shaft 6 by a belt 255. The curved mouth is open at each side and tapers to a narrow slit as seen in Figure 35 so that the lead wires 18 can just project into the mouth and convey the condenser disc 22 from side to side of the mouth 252 while the paint is running through it. The paint which is not taken up by the condensers dribbles from the mouth and is collected in a trough 256 which leads it back into a tank 257 from which it is recirculated by the pump 254. This method of applying the paint is rapid and involves the minimum of exposure to air of the paint during application. It is therefore economical and also enables a very even and satisfactory coating to be obtained. The strip then passes over an idle roller 258 and around an idle sprocket 259 which reverses the direction of the strip so that the condensers are turned over and drips and globules forming on the condensers 22 are evened out. The direction of the strip is once more reversed round the sprocket 260 and after passing over a sprocket 261, the strip is led down to a sprocket 262 and over a guide roller 263 before passing to the drying oven O. A drip tray 264 is provided beneath the roller 258 and sprockets 259 and 261 to catch any drips falling from the condenser discs and convey the paint back to the tank 257.

Figure 36:
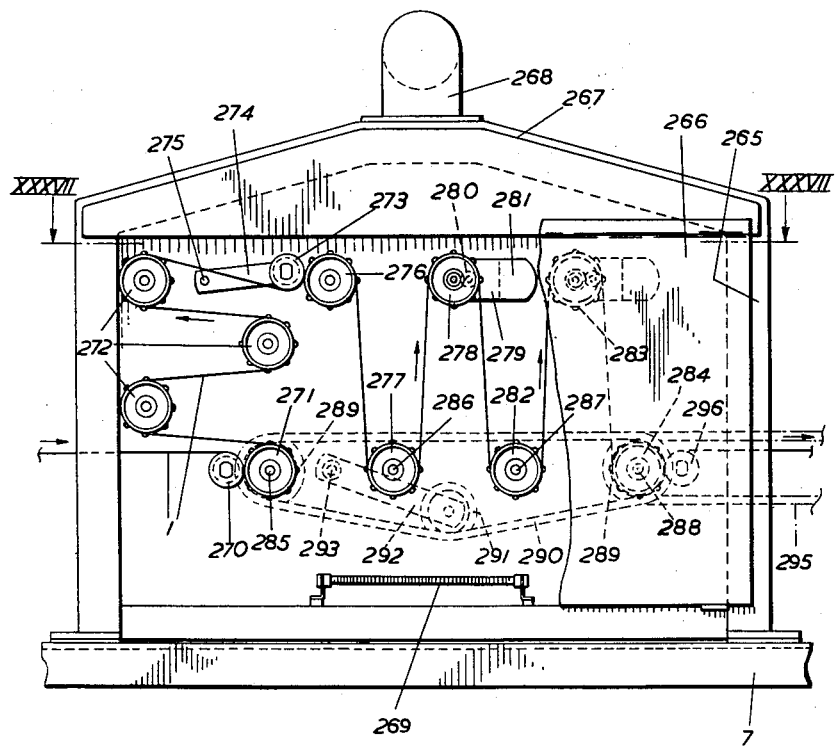
Figure 37:
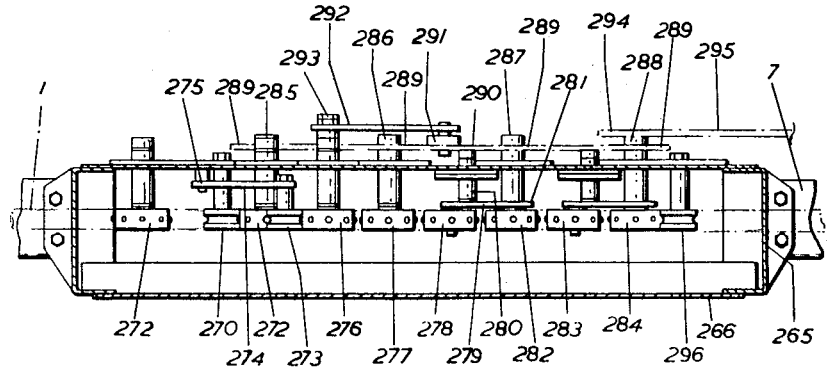
Figure 37 is a section of Figure 36 on the line XXXVII—XXXVII.

The drying oven O is shown in Figures 36 and 37. The oven consists of a casing 265 provided with a glass door 266 and closed at the top by a roof 267 with a ventilating cowl 268. An electric heating element 269 is mounted at the bottom of the oven. The strip 1 enters through an opening in the left hand side of the oven as seen in Figure 36 and passes round a guide roller 270 and then over a constantly driven sprocket 271. It then passes round three idle sprockets 272 as shown and then beneath a tension roller 273 on an arm 274 pivoted at 275 before passing over an idle sprocket 276 after which it passes round a second driven sprocket 277. It now passes over an idle sprocket 278 carried on an arm 279 pivoted at 280 and having at its other end a weight 281 which keeps the strip in tension as it passes down to a third driven sprocket 282. A similar counter-weighted idle sprocket 283 is provided between the driven sprocket 282 and a fourth driven sprocket 284. The four driven sprockets 271, 277, 282 and 284 are all arranged at the same level on shafts 285, 286, 287 and 288 respectively, each of which carries an exactly similar chain wheel 289 around which a chain 290 runs and kept in tension by a jockey chain wheel 291 on an arm 292 pivoted at 293. The shaft 288 also carries a second similar chain wheel 294 by which it is driven by the chain 295 from the curing oven P as will be described.

The paper strip after passing round the driven sprocket 284 in the oven O, passes over a guide roller 296 and out from an aperture in the right hand side of the oven O and passes immediately into a curing oven P shown in Figures 38 and 39. This is of similar construction to the drying oven O although somewhat taller and comprises a case 297 with a glass door 298 and having a heater 299 at the bottom. The paper strip 1 enters through an aperture on the left hand side in Figures 38 and 39, and after passing over an idle roller 300, passes alternately under five driven sprockets 301 and over four idle sprockets 302 carried on pivoted counter-weighted arms 303 at the top of the machine. The driven sprockets are mounted on shafts 304, 305, 306, 307 and 308, each of which carries a similar chain wheel 309. The chain 310 runs round these chain wheels and also round a jockey chain wheel 311 carried on an arm 312 pivoted at 313. The shaft 304 also carries a similar chain or sprocket wheel 314 by which the chain 295 for the first drying oven O is driven. Both ovens are driven in this way from the shaft 6 by a chain drive 315 to a shaft 316 by which the shaft 308 is driven by bevel gearing 317, 318.

After leaving the last driven sprocket 301, the strip 1 passes over an idle roller 319 and out from an aperture from the right side of the oven P after which it passes beneath a roller 320 and then runs up over a sprocket 321 providing a cooling loop in the strip before passing round the sprocket 322 on the end of the arm 323 pivoted at 324. The strip then passes to the sprocket F and reservoir sprocket Q shown on the left of Figure 40. The strip passes over the idle roller 325 and then round the sprocket 326 on a shaft 327 which is driven by bevel gearing from a shaft not shown, which is driven by one to one gearing from a shaft 328 carrying a chain wheel 329 by a chain 230 from a chain wheel on the shaft 6. The strip then passes over a second idle roller 332 to the reservoir sprocket 333 carried on the end of a long arm 334, pivoted to a bracket 335 at 336 and biassed by a spring 337. The strip now conveys the condensers through the flash testing equipment R, around a reservoir sprocket 32, through the first capacity test equipment S, around a reservoir sprocket 33 similar to the sprocket 32 and through the second capacity test equipment T and coding mechanism U to the counter V which records the number of condensers produced. The strip passes again round a second driven sprocket mechanism F and reservoir sprocket Q and then passes as shown in Figure 40 to a sprocket 338 mounted on a shaft 339 which also carries a ratchet wheel 340 with which a pawl 341 engages to prevent the sprocket 338 from turning backwards thus preventing the spring 337 of the reservoir sprocket 333 from drawing the strip backwards away from the guillotine Q.

The strip now passes between two idle rollers 342 to the guillotine Q shown in Figures 40 and 41 which comprises a knife 343 mounted on vertical guides 344 and operated by a handle 345 pivoted at 346 and biassed upwards by a spring 347. The handle 345 passes through a hole 348 in the knife 343. The strip is cut into the desired lengths between the knife 343 and a lower stationary blade 349 when the handle 345 is brought down. The strip with the condensers is pulled from the guillotine onto the table W by the operator and to make it more easy for the operator to grasp the end of the strip 1 between the guillotine knife 343 and the blade 349, the end of the strip is normally held raised above the bottom blade 349 by the lifter 350 which is a smooth guide plate secured to a bracket 351 pivoted at 352, and having a counter weight 353 which causes the right hand end of the lifter 350 to raise the strip 1 against a fixed guide 354. When the blade 343 is brought down of course, the lifter 350 yields into a position shown dotted in Figure 41.

I claim:

1. A method of manufacturing electrical components which comprises withdrawing a flat thin conveyor strip of expendible flexible material from a stock, threading lead wires in groups of at least two each through holes in the strip, securing the body of the electrical component to the lead wires of each group, advancing the strip and, while the wires are still carried by the strip, performing at least one further manufacturing operation on the body.

2. A process as claimed in claim 1 in which said holes are punched in the strip after it is withdrawn from the stock.

3. A process as claimed in claim 2 in which sprocket holes are punched in the strip after it is withdrawn from the stock and the strip is advanced by means of such sprocket holes.

4. A process as claimed in claim 1 in which said further manufacturing operation comprises application of a liquid coating to the body.

5. Apparatus for manufacturing small electrical components comprising means to withdraw a flat thin conveyor strip of flexible expendible material from a stock, means to punch holes in the strip, means to thread lead wires through such holes in groups of at least two each, means to position the body of the electrical component between the wires of each group, and means to advance the strip.

6. Apparatus according to claim 5, in which a mechanism is provided for perforating the strip with sprocket holes, and sprockets are provided to locate the strip and to feed it.

References Cited in the file of this patent

UNITED STATES PATENTS

| | | |
|---|---|---|
| 2,128,990 | Dubilier | Sept. 6, 1938 |
| 2,181,695 | Given | Nov. 28, 1939 |
| 2,251,609 | Freeburg | Aug. 5, 1941 |
| 2,280,789 | Brennan | Apr. 28, 1942 |
| 2,302,545 | Hankoff | Nov. 17, 1942 |
| 2,321,071 | Ehrhardt et al. | June 8, 1943 |
| 2,495,734 | Katzman et al. | Jan. 31, 1950 |
| 2,518,450 | Cowen et al. | Aug. 15, 1950 |
| 2,565,301 | Foster et al. | Aug. 21, 1951 |
| 2,606,955 | Herrick | Aug. 12, 1952 |
| 2,710,441 | Heyman | June 14, 1955 |
| 2,766,510 | Heibel | Oct. 16, 1956 |

FOREIGN PATENTS

| | | |
|---|---|---|
| 121,184 | Australia | Mar. 28, 1946 |